United States Patent
Chan et al.

(10) Patent No.: US 10,554,811 B2
(45) Date of Patent: Feb. 4, 2020

(54) PREDICTING 'USEFULLNESS' OF A CALL BY ANALYSING DIGITAL FOOTPRINT OF A PERSON

(71) Applicant: INTERNATIONAL BUSINESS MACHINES CORPORATION, Armonk, NY (US)

(72) Inventors: Yuk L. Chan, Rochester, NY (US); Heidi Lagares-Greenblatt, Jefferson Hills, PA (US); Deepti M. Naphade, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/991,563

(22) Filed: May 29, 2018

(65) Prior Publication Data
US 2019/0373110 A1     Dec. 5, 2019

(51) Int. Cl.
*H04M 3/436* (2006.01)
*G06F 17/27* (2006.01)
*H04M 3/533* (2006.01)

(52) U.S. Cl.
CPC ............ *H04M 3/436* (2013.01); *G06F 17/27* (2013.01); *H04M 3/533* (2013.01); *H04M 2203/556* (2013.01)

(58) Field of Classification Search
CPC . H04M 3/436; H04M 3/533; H04M 2203/556
USPC .................................................. 379/210.02
See application file for complete search history.

(56) References Cited

U.S. PATENT DOCUMENTS

| | | | |
|---|---|---|---|
| 8,428,556 B2 | 4/2013 | Yamasaki | |
| 8,831,192 B1 | 9/2014 | Clarke | |
| 8,848,879 B1 | 9/2014 | Coughlan et al. | |
| 8,913,994 B2 | 12/2014 | Edwards et al. | |
| 8,983,440 B1 | 3/2015 | Saylor | |
| 9,203,954 B1 | 12/2015 | Van Rensburg et al. | |
| 9,226,159 B1* | 12/2015 | Cao | H04W 12/12 |
| 9,544,425 B2 | 1/2017 | Yao et al. | |
| 2002/0131565 A1* | 9/2002 | Scheuring | G06Q 10/109 |
| | | | 379/88.19 |

(Continued)

FOREIGN PATENT DOCUMENTS

CN    203167080 U    8/2013
EP    1691538 A1     8/2006

OTHER PUBLICATIONS

Mell et al., "The NIST Definition of Cloud Computing," U.S. Department of Commerce, National Institute of Standards and Technology, Sep. 2011, p. 1-7, Special Publication 800-145.

(Continued)

*Primary Examiner* — Harry S Hong
(74) *Attorney, Agent, or Firm* — Dmitry Paskalov (57) ABSTRACT

The computing device may map the incoming number to a caller data to identify a caller. The computing device may determine, by data analytics, a type of service the user is seeking based on determining that the caller is one or more from a service provider, a company or a cause. The computing device may reject the incoming number based on determining the caller does not correspond to the type of service the user is seeking. The computing device may determine, by data analytics, a relation of the person to the user based on determining the caller is a person and rejects the incoming number based on determining the person is not related to the user.

20 Claims, 5 Drawing Sheets

(56) References Cited

U.S. PATENT DOCUMENTS

| | | | |
|---|---|---|---|
| 2004/0213396 A1 | 10/2004 | MacNamara et al. | |
| 2005/0271196 A1 | 12/2005 | Florkey et al. | |
| 2006/0029189 A1 | 2/2006 | Patel et al. | |
| 2006/0147014 A1 | 7/2006 | Smith et al. | |
| 2007/0197233 A1 | 8/2007 | Feng | |
| 2007/0201660 A1 | 8/2007 | Lan et al. | |
| 2009/0086720 A1* | 4/2009 | Westlake | H04L 12/66 370/352 |
| 2009/0103701 A1 | 4/2009 | Garg et al. | |
| 2011/0300884 A1* | 12/2011 | Ollila | G06F 3/0237 455/466 |
| 2014/0274003 A1 | 9/2014 | Belford et al. | |
| 2015/0172460 A1 | 6/2015 | Foss | |
| 2015/0189082 A1 | 7/2015 | Pfeffer et al. | |
| 2016/0219150 A1 | 7/2016 | Brown | |
| 2017/0104875 A1 | 4/2017 | Im et al. | |

OTHER PUBLICATIONS

Facebook, "How to find my friend account by using his phone number?", Facebook.com, Help Community, https://www.facebook.com/help/community/question/?id=841402935871962, printed on Jan. 19, 2018, pp. 1-2.

Chan et al., U.S. Appl. No. 15/362,850, titled: "Intelligent Call Screening", filed Nov. 29, 2016, pp. 1-41.

O'Reilly, "Screen unwanted calls without one-at-a-lime blocking," CNET, Security, https://www.cnel.com/how-to/screen-unwanled-calls-without--0ne-at-a-lime-blocking/, Printed on Sep. 6, 2016, pp. 1-10.

Tobin, "Social Network Profile Searches by Cell Phone Number," New Orleans Social Media Consulting, Conversations, http://www.neworleanssocialmediaconsulting.com/social-network-profile-searches-by-cell-phone-number/, Jun. 6, 2014, pp. 1-4, Printed on Sep. 6, 2016.

Tech News Daily, "Facebook lists user phone numbers For all to see," Fox News, Tech, http://www.foxnews.com/tech/2012/10/10/facebook-lists-user-phone-numbers-for-all-to-see.html, Published Oct. 10, 2012, pp. 1-7, Printed on Sep. 6, 2016.

Tu et al., "SoK: Everyone Hates Robocalls: A Survey of Techniques against Telephone Spam," 2016 IEEE Symposium on Security and Privacy, Copyright 2016, Huahong Tu, Under license to IEEE, IEEE Computer Society, pp. 320-338.

* cited by examiner

PREDICTING 'USEFULLNESS' OF A CALL BY ANALYSING DIGITAL FOOTPRINT OF A PERSON

BACKGROUND

The present invention relates, generally, to the field of computing, and more particularly to call screening by applying data analytics to both digital footprint and social media.

Data analytics relates, typically, the discovery, interpretation, and communication of meaningful patterns in data areas rich with recorded information. Data analytics relies on an extensive use of computer skills, such as mathematics and statistics, combined with the use of descriptive techniques and predictive models to gain valuable knowledge from data analysis.

A digital footprint is typically a unique set of traceable digital activities, actions, contributions and communications that are manifested on the Internet or on computing devices.

Social media relate to computer-mediated technologies that facilitate the creation and sharing of information, ideas, career interests and other forms of expression via virtual communities and networks of the computing devices.

SUMMARY

According to one embodiment, a method, computer system, and computer program product for screening of an incoming call is provided. The present invention may include computing device receives an incoming number, where the incoming number identifies the incoming call. The computing device may map the incoming number to a caller data to identify a caller. The computing device may determine, by data analytics, a type of service the user is seeking based on determining that the caller is one or more from a service provider, a company or a cause. The computing device may reject the incoming number based on determining the caller does not correspond to the type of service the user is seeking. The computing device may determine, by data analytics, a relation of the person to the user based on determining the caller is a person and rejects the incoming number based on determining the person is not related to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to call screening by applying data analytics to both digital footprint and social media. The following described exemplary embodiments provide a system, method, and program product to, among other things, screen incoming calls using data analytics. Therefore, the present embodiment has the capacity to improve the technical field of call screening by determining whether the incoming call number is related to a user by classifying whether the phone number is associated with a person or service of interest to the user.

As previously described, data analytics relates, typically, the discovery, interpretation, and communication of meaningful patterns in data areas rich with recorded information. Data analytics relies on an extensive use of computer skills, such as mathematics and statistics, combined with the use of descriptive techniques and predictive models to gain valuable knowledge from data analysis.

Receipt of spam calls, such as advertisements or unwanted calls, is a well-known problem for a smartphone user. Typical solutions to spam calls screening use static information (i.e. if a call number is on the blacklist or "no call" list the smartphone rejects the call), therefore these solutions do not adapt to changing circumstances, such as phone number changes or emergency situations. (i.e. in instances when an auto-dialer calls from multiple lines with a pre-recorded message). An example of a static solution is a program accepting only calls from an identifiable number that is saved in the phonebook of a smartphone. As such, it may be advantageous to, among other things, implement a system that determines whether the incoming call is related to a person or a service. Using data analytics of the digital footprint and social media may assist in determining whether a user is interested in the person or service and, based on that determination, accepts or rejects the incoming call.

According to one embodiment, a call data analytics program may receive an incoming number, map the received call to a person or a service provider by analyzing a digital footprint and social media presence of the caller and determine, using data analytics, whether the user may be interested in the person or service provider and, if determining the user would not be interested in answering the call, reject the incoming call based on that determination.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to perform an efficient and dynamic call screening using data analytics of the available user footprint and social media data, where the determination whether the incoming call number is related to a user is performed by classifying whether the phone number is associated with a person or service of interest to the user.

Figure 1:
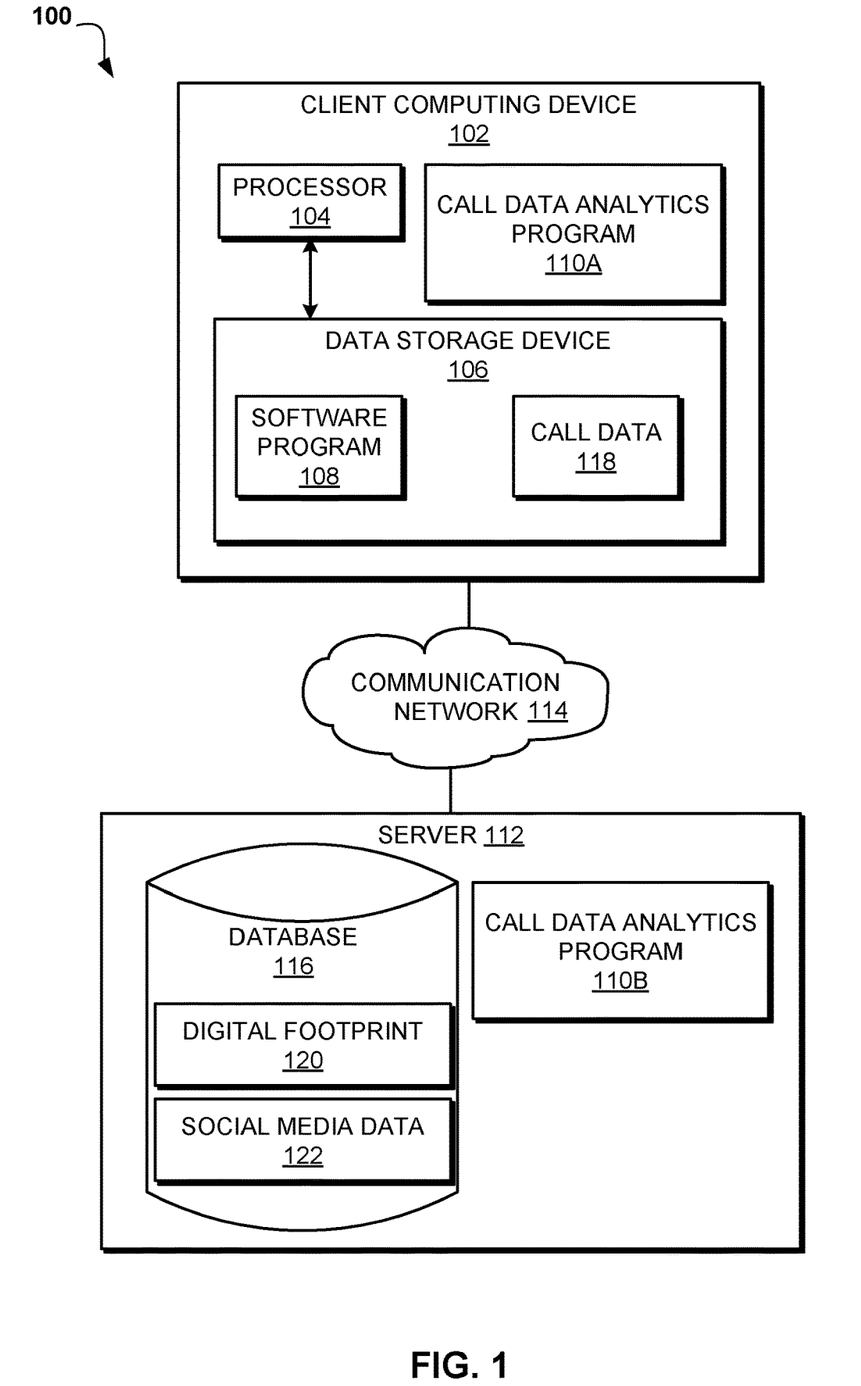
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host call data 118 and run a software program 108 and a call data analytics (CDA) program 110A and communicate with the server 112 via the communication network 114, in accordance with one embodiment of the invention. Client computing device 102 may be, for example, a mobile device, a telephone (smartphone), a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server 112 may be a laptop computer, netbook computer, personal computer (PC), a desktop computer, or any programmable electronic device or any network of programmable electronic devices capable of hosting and running a CDA program 110B and a database 116 and communicating with the client computing device 102 via the communication network 114, in accordance with embodiments of the invention. As will be discussed with reference to FIG. 3, the server 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Database 116 may be a data repository capable of storing information, such as digital footprint 120 and social media data 122. Digital footprint 120 may be a combined database with a set of software tools that are designed to allow analysis of user behavior. For example, digital footprint 120 may be a database that stores all the recent searches made by the user over the Internet, including the date and time of the search. Social media data 122 may be a combined database with a set of software tools that are designed to allow analytics of social media website data related to users and companies, such as phone numbers of the user or the company, employee names, and employee positions in the company. For example, social media data 122 may be updated during runtime or when a user accesses a social media service. In another embodiment, digital footprint 120 and social media data 122 may be located on data storage device 106 or loaded using internal components 302 a,b or external components 304 a,b.

According to the present embodiment, the CDA program 110A, 110B may be a program capable of receiving an incoming call number, mapping the call number to a service or a person, analyze the digital footprint and the social media data associated with the call number to determine whether the user is seeking the service or person associated with the call number, and accept or reject the call based on the determination. The call data analytics method is explained in further detail below with respect to FIG. 2.

Figure 2:
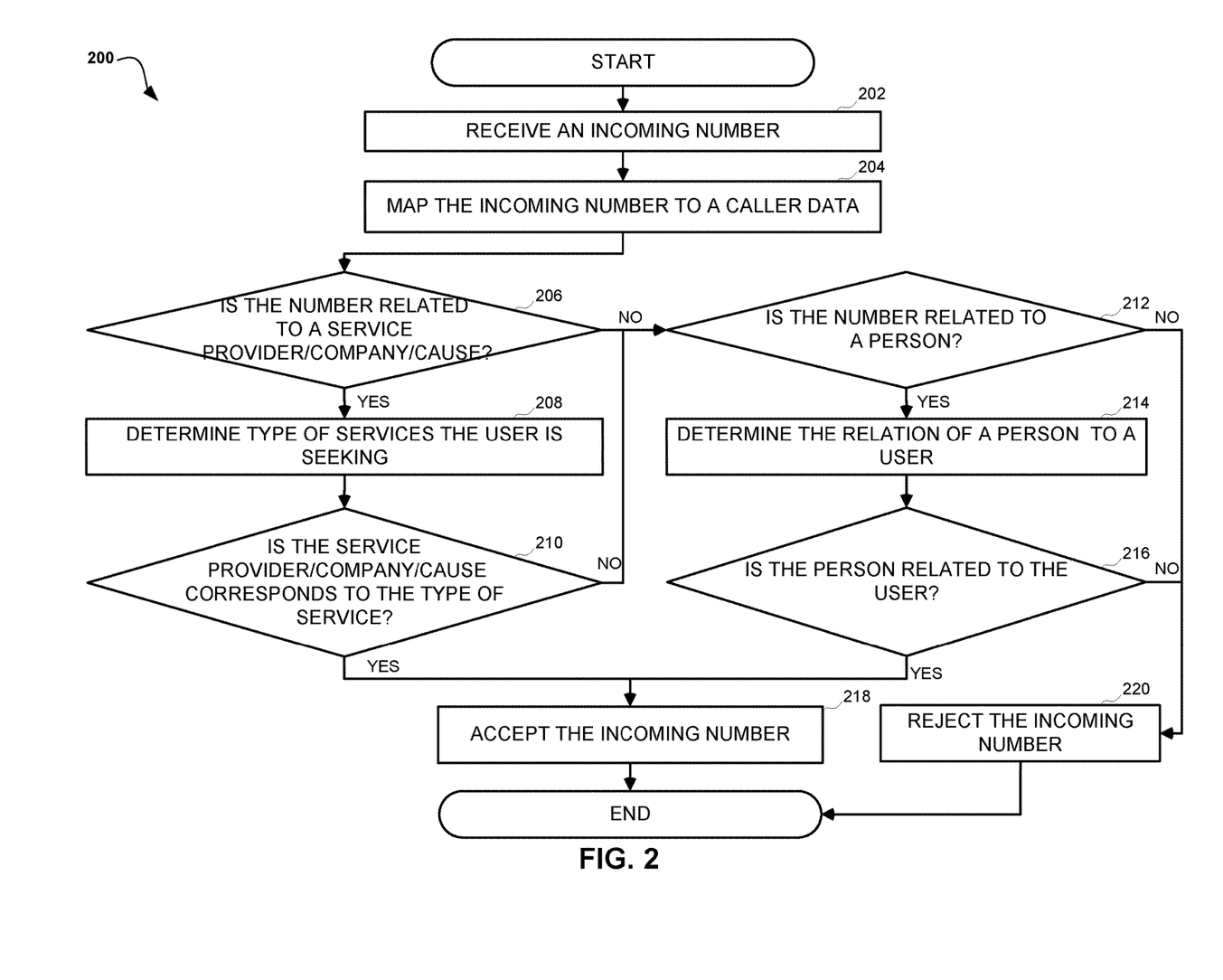
FIG. 2 is an operational flowchart illustrating a call data analytics process according to at least one embodiment.

Referring now to FIG. 2, an operational flowchart illustrating a call data analytics process 200 is depicted according to at least one embodiment. At 202, the CDA program 110A, 110B receives an incoming number. According to an example embodiment, CDA program 110A, 110B may receive a call number, a user number or any other identifier that is used to accept a call.

Next, at 204, CDA program 110A, 110B maps the incoming number to caller data. According to an example embodiment, CDA program 110A, 110B may access call data 118 and determine whether the incoming number is associated with a caller who may be a person, a corporation, a service provider, or a cause (such as non-profit organizations). In another embodiment, CDA program 110A, 110B may determine the association of the number to a person or a service by searching social media data 122 and applying data analytics to match the corresponding data to a person or a service provider, such as by using vectorization, tokenization or other natural language processing techniques. Mapping the incoming call to a service provider, company, and cause may be achieved using matching techniques or word embedding data analytics. CDA program 110A, 110B may perform matching techniques or word embedding vectorization by utilizing trained neural networks to compare the determined data from social media data 122 to a predetermined list of causes and service providers. Word embedding is, typically, a collective name for a set of language modeling and feature learning techniques in natural language processing where words or phrases from the vocabulary are mapped to vectors or coordinates of real numbers.

Then, at 206, the CDA program 110A, 110B determines whether a number is related to a service/provider/company/cause. According to an example embodiment, CDA program 110A, 110B may determine whether the incoming call number is related to a service/provider/company/cause using word embedding. For example, a cause may be determined as a field in a vector space and if the vectorization of a text associated with the incoming number falls in that field in the vector space then the number is related with that cause. If the CDA program 110A, 110B determines that the number is related to a service provider/company/cause (step 206, "YES" branch), the CDA program 110A, 110B may continue to step 208 to determine the type of service the user is seeking. If the CDA program 110A, 110B determines that the number is not related to a service provider/company/cause (step 206, "NO" branch), the CDA program 110A, 110B may continue to step 212 to determine whether the number is related to a person.

Next, at 208, CDA program 110A, 110B determines a type of service the user is seeking. According to an example embodiment, CDA program 110A, 110B may determine a type of service the user is seeking by performing data analytics of a digital footprint 120. According to an example embodiment, a trained neural network may extract the type of service the user is seeking from the digital footprint 120 or convert the digital footprint 120 into a vector field using word embedding. In another embodiment, the type of service may be extracted using word embedding. In a further embodiment, the type of service may be extracted by searching or mining the digital footprint 120 with predetermined words that represent type of service, such as by applying statistical patent learning.

Then, at 210, the CDA program 110A, 110B determines whether a service provider/company/cause corresponds to the type of service. According to an example embodiment, CDA program 110A, 110B may determine whether a service provider/company/cause corresponds to the type of service using word embedding. For example, a type of service the user is seeking maybe transformed to a vector field and if the embedded service provider/company/cause (i.e. vector representing the service provider/company/cause) is within a threshold value from the field then service provider/company/cause corresponds to the type of service the user is seeking. If the CDA program 110A, 110B determines that the service provider/company/cause corresponds to the type of service (step 210, "YES" branch), the CDA program 110A, 110B may continue to step 218 to accept the incoming number. If the CDA program 110A, 110B determines that the service provider/company/cause associated with the number does not correspond to the type of service the user seeks (step 210, "NO" branch), the CDA program 110A, 110B may continue to step 212 to determine whether the number is related to a person.

Next, at 212, the CDA program 110A, 110B determines whether the number is related to a person. As previously mentioned in step 204, CDA program 110A, 110B may map the incoming number to more than one service, to more than one person, or both. According to an example embodiment, CDA program 110A, 110B may determine whether the number is related to a person by identifying at least one name in the mapped caller data. For example, if the caller information corresponding to the incoming number extracted from caller data 118, digital footprint 120 or social media data 122 includes at least one name then the number is related to a person. Names of a person in caller data may be determined using natural language processing such as by tokenization. If the CDA program 110A, 110B determines that the number is related to a person (step 212, "YES" branch), the CDA program 110A, 110B may continue to step 214 to determine the relation of a person to a user. If the CDA program 110A, 110B determines that the number is not related to a person (step 212, "NO" branch), the CDA program 110A, 110B may continue to step 220 to reject the incoming number.

Next, at 214, CDA program 110A, 110B determines the relation of a person to a user. According to an example embodiment, CDA program 110A, 110B may determine the relation of a person to a user by performing data analytics of the digital foot print 120, social media data 122 and call data 118. For example, a person may be directly related to a user if the name of the person may be found in call data 118, or in digital foot print 120. In another embodiment, if the person name is found in social media data 122, the CDA program 110A, 110B may determine the relation of the person to a user by accessing a friend list, a coworker list, or personal data of the user and associating the person and the user in a connection tree.

Next, at 216, the CDA program 110A, 110B determines whether the person is related to the user. According to an example embodiment, CDA program 110A, 110B may analyze the relation of the person to the user according to a predetermined conditions and determine whether the person is related by determining whether the user and a person are related to each other to a threshold degree based on a timeframe or links in a connection tree. For example, when the person is related to the user due to their mutual participation in the event that was scheduled to occur on a specific date, and the specific date occurred outside of the predetermined timeframe, the CDA program 110A, 110B may determine that a person is not related to the user. In another embodiment if the person is related to the user more than through a direct friend found in a social media, CDA program 110A, 110B may generate a connection tree, where the connection tree represents a chain of relations between the user and a person. In another embodiment the relation between the person and the user may be determined from analyzing their interaction, such as chat frequency, engagement level, compatibility. If the connection tree is longer than a threshold connection value the person is not related. If the CDA program 110A, 110B determines that person is related to the user (step 216, "YES" branch), the CDA program 110A, 110B may continue to step 218 to accept the incoming number. If the CDA program 110A, 110B determines that the person is not related to the user (step 216, "NO" branch), the CDA program 110A, 110B may continue to step 220 to reject the incoming number.

In another embodiment, the acceptance of the incoming call might be based on a user's readiness to accept the call, or reject it when the user is busy. According to an embodiment, the caller's relationship with the user might dynamically influence the importance of the call. Depending on the importance of the call, the CDA program 110A, 110B may assign an importance level, which may be compared to a predetermined importance value to accept or reject the call. The predetermined importance value may be determined by a user or adjusted automatically, such as increased during meetings or appointments in order to allow only very important calls. For example, if the user's social network indicates the user is currently attending a meeting at work, and the user typically does not accept calls during meetings, the CDA program 110A, 110B may determine to accept a call, based to determining that the assigned importance level of the call is still above the predetermined value, such as when the caller is the event organizer.

Next, at 218, CDA program 110A, 110B accepts the incoming number. According to an example embodiment, CDA program 110A, 110B may transfer an incoming call to a user for answering. In another embodiment, CDA program 110A, 110B may transfer the call to a user and display the associated service provider/company/cause or name and connection tree of the person to a user.

Next, at 220, CDA program 110A, 110B rejects the incoming number. According to an example embodiment, CDA program 110A, 110B may transfer an incoming call to an automatic answering machine to leave a message or reject the call. In another embodiment, CDA program 110A, 110B may reject the call and display the association with the incoming number caller service provider/company/cause or name and connection tree of the person to a user. In a further embodiment, CDA program 110A, 110B may transmit the determined data such as associated with the call service provider/company/cause or name and connection tree of the person to a user using a messaging service, email service, or other type of notification service of the client computing device 102.

It may be appreciated that FIG. 2 provides only an illustration of one implementation and does not imply any limitations with regard to how different embodiments may be implemented. Many modifications to the depicted environments may be made based on design and implementation requirements.

Figure 3:
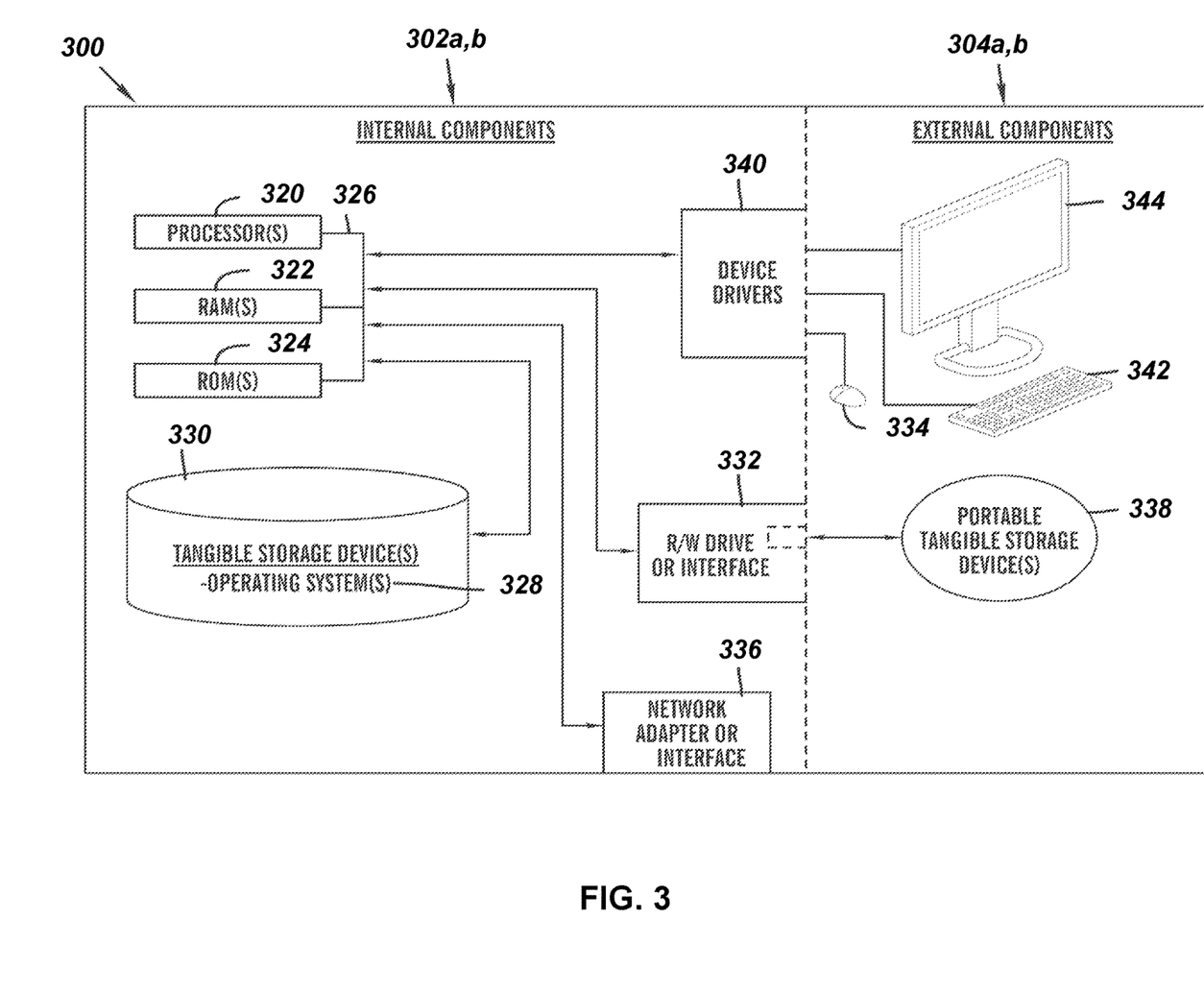
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the CDA program 110A in the client computing device 102, and the CDA program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the CDA program 110A in the client computing device 102 and the CDA program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the CDA program 110A in the client computing device 102 and the CDA program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
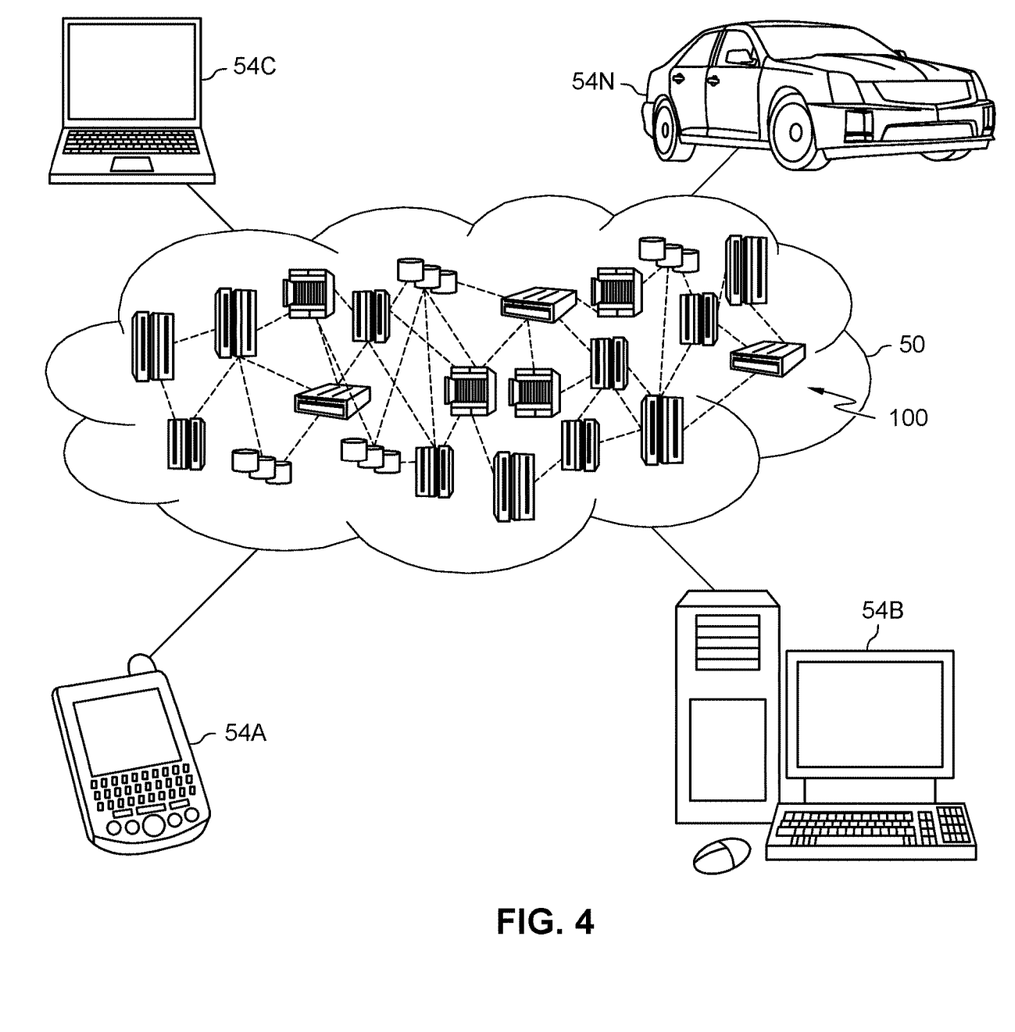
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
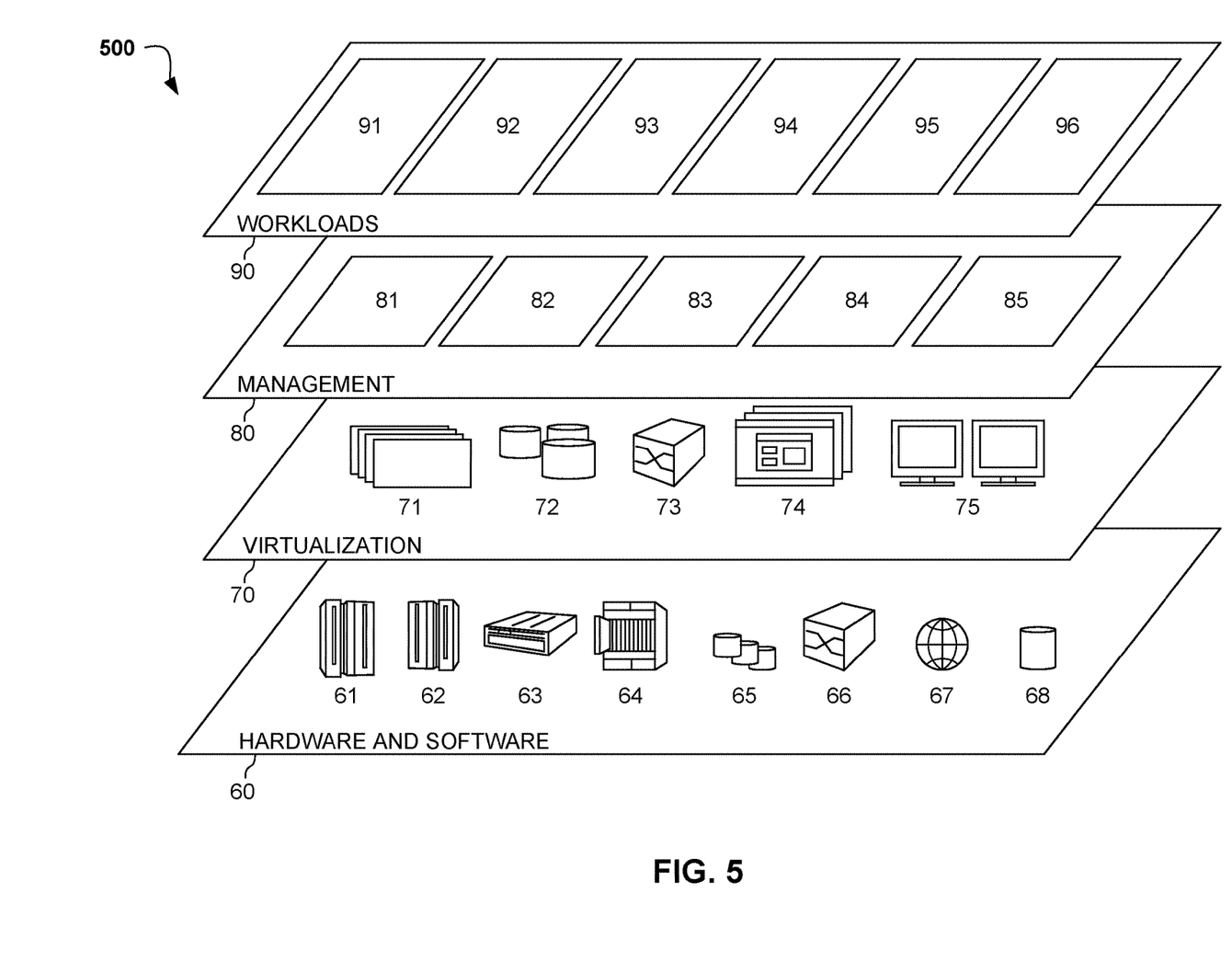
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and call data analytics 96. Call data analytics 96 may relate to mapping an incoming number to a caller data and based on determination, by data analytics, that the incoming call is related to the service provider/company/cause or a person that the user is seeking accepting the call.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for screening an incoming call, the method comprising:
   receiving an incoming number of the incoming call;
   identifying a caller based on mapping the incoming number to caller data;
   based on determining that the caller is a service provider, a company or a cause, determining, through data analytics, a type of service a user of a client computing device is seeking;
   based on determining that the caller is a person, determining, by data analytics, a relation of the person to the user of the client computing device;
   based on determining that the caller does not correspond to the type of service the user of the client computing device is seeking, rejecting the incoming number; and
   based on determining that the person is not related to the user of the client computing device, rejecting the incoming number.

2. The method of claim 1, wherein identifying the caller based on mapping the incoming number to caller data is performed using word embedding vectorization.

3. The method of claim 1, wherein the type of service the user of the client computing device is seeking is based on analyzing a digital footprint.

4. The method of claim 3, wherein determining that the caller does not correspond to the type of service the user of the client computing device is seeking further comprises:
   converting the digital footprint of the type of service the user of the client computing device is seeking to a vector field; and
   determining that the caller does not correspond to the type of service the user of the client computing device is seeking by determining that a vector representation of the caller is not within a threshold value from the vector field.

5. The method of claim 1, wherein determining, by data analytics, the relation of the person to the user of the client computing device is based on social media data and further comprises determining an importance level of the incoming call based on analyzing the social media data.

6. The method of claim 5, wherein determining the relation of the person to the user of the client computing device further comprises:
   based on determining that a connection tree is longer than a threshold connection value, determining that the person is not related to the user of the client computing device; and
   based on determining that a date of the relation of the person to the user of the client computing device is more than a predetermined timeframe, determining that the person is not related to the user of the client computing device.

7. The method of claim 6 wherein rejecting the incoming number is based on comparing the importance level of the incoming call with a predetermined importance value and further comprises transmitting the connection tree using a notification service.

8. A computer system for screening an incoming call, the computer system comprising:
   one or more processors, one or more computer-readable memories, one or more computer-readable non-transitory storage media, and program instructions stored on at least one of the one or more non-transitory storage media for execution by at least one of the one or more processors via at least one of the one or more memories, wherein the computer system is capable of performing a method comprising:
   receiving an incoming number of the incoming call;
   identifying a caller based on mapping the incoming number to caller data;
   based on determining that the caller is a service provider, a company or a cause, determining, through data analytics, a type of service a user of a client computing device is seeking;
   based on determining that the caller is a person, determining, by data analytics, a relation of the person to the user of the client computing device;
   based on determining that the caller does not correspond to the type of service the user of the client computing device is seeking, rejecting the incoming number; and
   based on determining that the person is not related to the user of the client computing device, rejecting the incoming number.

9. The computer system of claim 8, wherein identifying the caller based on mapping the incoming number to caller data is performed using word embedding vectorization.

10. The computer system of claim 8, wherein the type of service the user of the client computing device is seeking is based on analyzing a digital footprint.

11. The computer system of claim 10, wherein determining that the caller does not correspond to the type of service the user of the client computing device is seeking further comprises:
    converting the digital footprint of the type of service the user of the client computing device is seeking to a vector field; and
    determining that the caller does not correspond to the type of service the user of the client computing device is seeking by determining that a vector representation of the caller is not within a threshold value from the vector field.

12. The computer system of claim 8, wherein determining, by data analytics, the relation of the person to the user of the client computing device is based on social media data and further comprises determining an importance level of the incoming call based on analyzing the social media data.

13. The computer system of claim 12, wherein determining the relation of the person to the user of the client computing device further comprises:
    based on determining that a connection tree is longer than a threshold connection value, determining that the person is not related to the user of the client computing device; and
    based on determining that a date of the relation of the person to the user of the client computing device is more than a predetermined timeframe, determining that the person is not related to the user of the client computing device.

14. The computer system of claim 13, wherein rejecting the incoming number is based on comparing the importance level of the incoming call with a predetermined importance value and further comprises transmitting the connection tree using a notification service.

15. A computer program product for screening an incoming call, the computer program product comprising:
    one or more computer-readable non-transitory storage media and program instructions stored on at least one of the one or more non-transitory storage media, the program instructions executable by a processor, the program instructions comprising:
    program instructions to receive an incoming number of the incoming call;

program instructions to identify a caller based on mapping the incoming number to caller data;

based on determining that the caller is a service provider, a company or a cause, program instructions to determine, through data analytics, a type of service a user of a client computing device is seeking;

based on determining that the caller is a person, program instructions to determine, by data analytics, a relation of the person to the user of the client computing device;

based on determining that the caller does not correspond to the type of service the user of the client computing device is seeking, program instructions to reject the incoming number; and based on determining that the person is not related to the user of the client computing device, program instructions to reject the incoming number.

16. The computer program product of claim 15, wherein the program instructions to identify the caller based on mapping the incoming number to caller data use word embedding vectorization.

17. The computer program product of claim 15, wherein the type of service the user of the client computing device is seeking is based on analyzing a digital footprint.

18. The computer program product of claim 17, wherein program instructions to determine that the caller does not correspond to the type of service the user of the client computing device is seeking comprise:

program instructions to convert the digital footprint of the type of service the user of the client computing device is seeking to a vector field; and program instructions to determine that the caller does not correspond to the type of service the user of the client computing device is seeking by determining that a vector representation of the caller is not within a threshold value from the vector field.

19. The computer program product of claim 15, wherein the program instructions to determine, by data analytics, the relation of the person to the user of the client computing device use social media data and further comprise program instructions to determine an importance level of the incoming call based on analyzing the social media data.

20. The computer program product of claim 15, wherein the program instructions to determine the relation of the person to the user of the client computing device further comprise:

based on determining that a connection tree is longer than a threshold connection value, program instructions to determine that the person is not related to the user of the client computing device; and based on determining that a date of the relation of the person to the user of the client computing device is more than a predetermined timeframe, program instructions to determine that the person is not related to the user of the client computing device.

* * * * *